United States Patent
Ruebusch et al.

(10) Patent No.: US 6,729,443 B2
(45) Date of Patent: May 4, 2004

(54) BRAKE FOR A TRANSAXLE (75) Inventors: Richard T. Ruebusch, New Albany, IN (US); Kevin L. Johnson, Douglas, GA (US); Douglas G. Williams, Bedford, IN (US); Phillip G. Ross, Salem, IN (US)

(73) Assignee: Tecumseh Products Company, Tecumseh, MI (US)

( * ) Notice: Subject to any disclaimer, the term of this patent is extended or adjusted under 35 U.S.C. 154(b) by 14 days.

(21) Appl. No.: 10/120,629

(22) Filed: Apr. 11, 2002

(65) Prior Publication Data

US 2002/0179379 A1 Dec. 5, 2002

Related U.S. Application Data (60) Provisional application No. 60/283,242, filed on Apr. 11, 2001.

(51) Int. Cl.$^7$ .............................................. F16D 55/08
(52) U.S. Cl. ................... 188/72.7; 188/72.3; 188/72.6; 188/72.9; 192/70.23; 74/411.5
(58) Field of Search ................ 188/72.7, 72.3, 188/72.6, 72.8, 72.9, 106 F; 74/411.5; 192/70.23, 70.3, 93 A (56) References Cited

U.S. PATENT DOCUMENTS

| | | | |
|---|---|---|---|
| 3,439,786 A | 4/1969 | Schmid | 192/4 |
| 3,485,329 A | 12/1969 | Hauser | 192/4 |
| 3,980,159 A | 9/1976 | Baxendale | 188/72.7 |
| 4,036,329 A | 7/1977 | Anderson | 188/72.7 |
| 4,102,440 A * | 7/1978 | Wood | 188/72.7 |
| 4,113,069 A * | 9/1978 | Craft et al. | 188/72.7 |
| 4,182,435 A | 1/1980 | Dadian | 188/72.7 |
| 4,633,979 A | 1/1987 | Edwards | 188/72.7 |
| 4,676,345 A | 6/1987 | Hillen et al. | 188/72.2 |
| 4,736,820 A | 4/1988 | Price et al. | 188/71.4 |
| 4,781,259 A | 11/1988 | Yamaoka et al. | 180/75 |
| 4,809,560 A | 3/1989 | Nemoto | 74/371 |
| 4,809,822 A | 3/1989 | Margetts | 188/72.7 |
| 4,903,546 A * | 2/1990 | Quintille | 74/411.5 |
| 4,966,256 A | 10/1990 | Hunt | 188/72.7 |
| 5,000,056 A | 3/1991 | Crawford et al. | 74/371 |
| 5,195,386 A * | 3/1993 | Havens et al. | 188/72.7 |
| 5,482,145 A | 1/1996 | Miyashita | 188/72.9 |
| 5,647,459 A * | 7/1997 | Buckley et al. | 188/72.9 |
| 5,794,443 A | 8/1998 | Shimizu | 60/456 |
| 5,918,709 A | 7/1999 | von Kaler | 188/196 B |
| 6,123,182 A * | 9/2000 | Dowen | 192/111 A |

* cited by examiner

*Primary Examiner*—Jack Lavinder
*Assistant Examiner*—Mariano Sy
(74) *Attorney, Agent, or Firm*—Baker & Daniels (57) ABSTRACT

A transaxle for a small utility vehicle or implement, including a casing, at least one rotatable shaft disposed in and extending from the casing, at least one brake disc rotatably fixed to the rotatable shaft for rotation therewith, and at least one braking mechanism with at least a portion of the braking mechanism being externally mounted on the casing proximate the rotatable shaft. The braking mechanism includes at least one friction puck disposed proximate the brake disc, and a brake shaft including a cam surface having a longitudinal edge, wherein the brake shaft has an engaged position in which the longitudinal edge is in operative engagement with the friction puck and the friction puck is in pressing engagement with the brake disc and a disengaged position in which the longitudinal edge is out of operative engagement with the friction puck.

19 Claims, 7 Drawing Sheets

BRAKE FOR A TRANSAXLE

CROSS-REFERENCE TO RELATED APPLICATION

This application claims the benefit under 35 U.S.C. § 119(e) of U.S. Provisional Application No. 60/283,242, filed Apr. 11, 2001.

BACKGROUND OF THE INVENTION

1. Field of Invention

The present invention relates to braking systems for use with small utility vehicles such as riding lawn mowers, lawn tractors and the like, specifically, disc braking systems.

2. Description of the Related Art

Typically, small utility vehicles and implements, such as riding lawn mowers, lawn tractors, and snow throwers, contain an internal combustion engine that supplies drive power in the form of rotary mechanical motion to the input of a transaxle. In some cases the transaxle then transfers this mechanical motion through a gearbox and then to a differential, which splits the rotary mechanical motion between two axles at the output of the transaxle. The axles each terminate with connections to wheels that engage the ground to drive the vehicle or implement. Braking systems are utilized with such vehicles to allow an operator to slow or stop motion of the vehicle, and to prevent runaway implements and resultant injuries.

Some previous braking systems have employed braking mechanisms that are mounted completely within the transaxle casings. A problem with such braking mechanisms is that the braking mechanisms must be assembled contemporaneously within the transaxle casings, and therefore any design changes in such braking mechanisms necessarily require additional complementary design changes in the transaxle casings. A further problem with these braking mechanisms is that the transaxle casings must be separated and the transaxle partially disassembled in order to access the braking mechanisms for servicing. In addition, locating the braking mechanisms within the transaxle casings increases the likelihood that the brake disc will be contaminated by oil, grease or other lubricants used to lubricate the gears and shafts within the transaxle, and may adversely affect brake performance.

Another previous braking mechanism utilizes a brake housing, which is mounted on the exterior of the transmission and includes a brake disc and brake pucks located externally of the transmission, and a brake lever, located on the exterior of a brake housing, which rotates to move a friction puck into braking engagement with the brake disc (U.S. Pat. No. 5,195,386). Such a braking mechanism structure allows the brake to be located externally of the transmission, but requires the use of several components for actuation of the brake, thereby raising the cost and complexity of the braking mechanism. Furthermore, such a structure requires additional assembly steps, thereby limiting the capability of the braking system being shipped with the transaxle and limiting the possibility of installation of the transaxle into a vehicle without requiring the vehicle manufacturer to conduct additional assembly of the transaxle, or the possibility of "drop-in" installation of a transaxle including the brake mechanism to a vehicle.

What is needed is a braking system for a small utility vehicle or implement that effectively stops, slows, or prevents motion of the vehicle. A further need is for a braking system that contains braking mechanisms mounted such that the braking mechanisms are readily accessible for servicing by not being internally disposed within the transaxle casing, cannot be contaminated by oil, grease, or other lubricants from within the transaxle casings, and can be shipped with the transaxle as a single unit to a final vehicle assembly location for "drop-in" installation to the vehicle.

SUMMARY OF THE INVENTION

The above-mentioned and described shortcomings are overcome by providing a braking mechanism which is mounted externally of the transaxle casing and which includes a removable cover, thereby providing access for servicing and preventing contamination by oil, grease, or other lubricants. Furthermore, the braking mechanism may include a portion formed with the transaxle casing such that the braking mechanism may be combined with the transmission into a single unit.

The present invention provides a transaxle for a small utility vehicle or implement, including a casing, at least one rotatable shaft disposed in and extending from the casing, at least one brake disc rotatably fixed to the rotatable shaft for rotation therewith, and at least one braking mechanism with at least a portion of the braking mechanism being externally mounted on the casing proximate the rotatable shaft. The braking mechanism includes at least one friction puck disposed proximate the brake disc, and a brake shaft including a cam surface having a longitudinal edge, wherein the brake shaft has an engaged position in which the longitudinal edge is in operative engagement with the friction puck and the friction puck is in pressing engagement with the brake disc and a disengaged position in which the longitudinal edge is out of operative engagement with the friction puck.

The present invention further provides a braking mechanism for a transaxle in a small utility vehicle with at least a portion of the braking mechanism being externally mounted to the transaxle. The braking mechanism includes a brake disc, at least one friction puck disposed proximate the brake disc, and a brake shaft including a cam surface having a longitudinal edge, wherein the brake shaft has an engaged position in which the longitudinal edge is in operative engagement with the friction puck and the friction puck is in pressing engagement with the brake disc and a disengaged position in which the longitudinal edge is out of operative engagement with the friction puck.

The present invention further provides a transmission for a vehicle including a casing, at least one rotating shaft extending from the casing, a brake disc rotatably fixed to the rotating shaft for rotation therewith, and at least one braking mechanism. The braking mechanism includes a brake housing with at least a portion of the brake housing being externally mounted on the casing, at least one friction puck disposed proximate the brake disc, and a brake shaft including a cam surface having a longitudinal edge. The brake shaft has a first, rotated position in which the longitudinal edge is in operative engagement with the friction puck such that the friction puck is in pressing engagement with the brake disc, and a second position wherein the longitudinal edge is not in operative engagement with the friction puck and the cam surface is disposed parallel to the friction puck.

BRIEF DESCRIPTION OF THE DRAWINGS

The above-mentioned and other features and advantages of this invention, and the manner of attaining them, will become more apparent and the invention itself will be better understood by reference to the following description of an embodiment of the invention taken in conjunction with the accompanying drawings, wherein.

Corresponding reference characters indicate corresponding parts throughout the several views. Although the drawings represent embodiments of the present invention, the drawings are not necessarily to scale and certain features may be exaggerated in order to better illustrate and explain the present invention. The exemplifications set out herein illustrate two embodiments of the invention and such exemplification is not to be construed as limiting the scope of the invention in any manner.

DETAILED DESCRIPTION

For the purposes of promoting an understanding of the principles of the invention, reference will now be made to the embodiments illustrated in the drawings and specific language will be used to describe the same. It will nevertheless be understood that no limitation of the scope of the invention is thereby intended.

Figure 1:
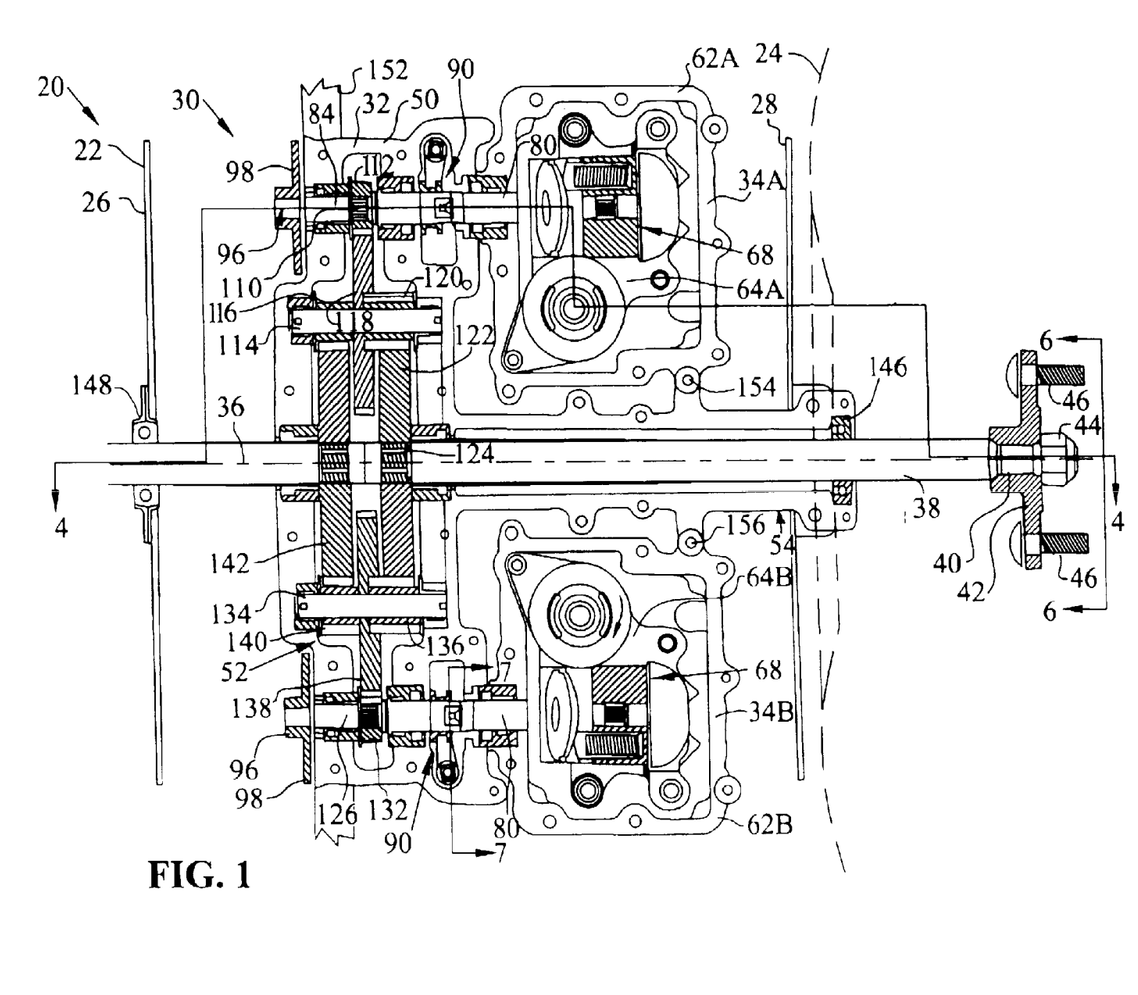
FIG. 1 is a sectional plan view of a hydrostatic transaxle for a zero turn mower including a first embodiment brake assembly according to the present invention in which a portion of the brake housing is integrally formed with the transaxle casing.

FIG. 1 shows a partial view of zero turn radius mower 20 having frame 22 and ground engaging drive wheels 24, one of which is shown in ghosted lines. Frame 22 includes left hand frame rail 26 and right hand frame rail 28. Between left and right hand frame rails 26 and 28 is disposed transaxle assembly 30 in accordance with the present invention. Transaxle 30 includes T-shaped axle housing 32 and two hydrostatic transmission modules 34a and 34b. Hydrostatic transmission modules 34a and 34b are mirror images of one another, and their structure and operation are described in U.S. Pat. No. 6,301,885 and U.S. patent applications Ser. Nos. 09/498,692, filed Feb. 7, 2000, and Ser. No. 09/671, 796, filed Sep. 27, 2000, all of which are assigned to Tecumseh Products Company, the disclosures of which are each expressly incorporated herein by reference.

Transaxle assembly 30 further includes left hand axle 36 and right hand axle 38 which abut within axle drive housing 32, but are not rotatably coupled together. The outboard ends of each of axles 36 and 38 are provided with splines 40 on which are fitted flanges 42 to which wheels 24 are attached. Nut 44 secures flange 42 onto the end of axles 36 and 38, and bolts 46 project through holes provided in flanges 42 and a center portion (not shown) of drive wheels 24. Nuts (not shown) threadedly engage bolts 46 to secure wheels 24 to flanges 42 in the conventional manner.

T-shaped housing 32 includes upper housing portion 48 and lower housing portion 50 which are attached to each other and interface along a substantially horizontal parting line. Upper and lower portions 48 and 50 of housing 32 define gear train enclosing portion 52 and longitudinal central leg or portion 54 through which axle 38 extends, as best shown in FIG. 1.

Figure 3:
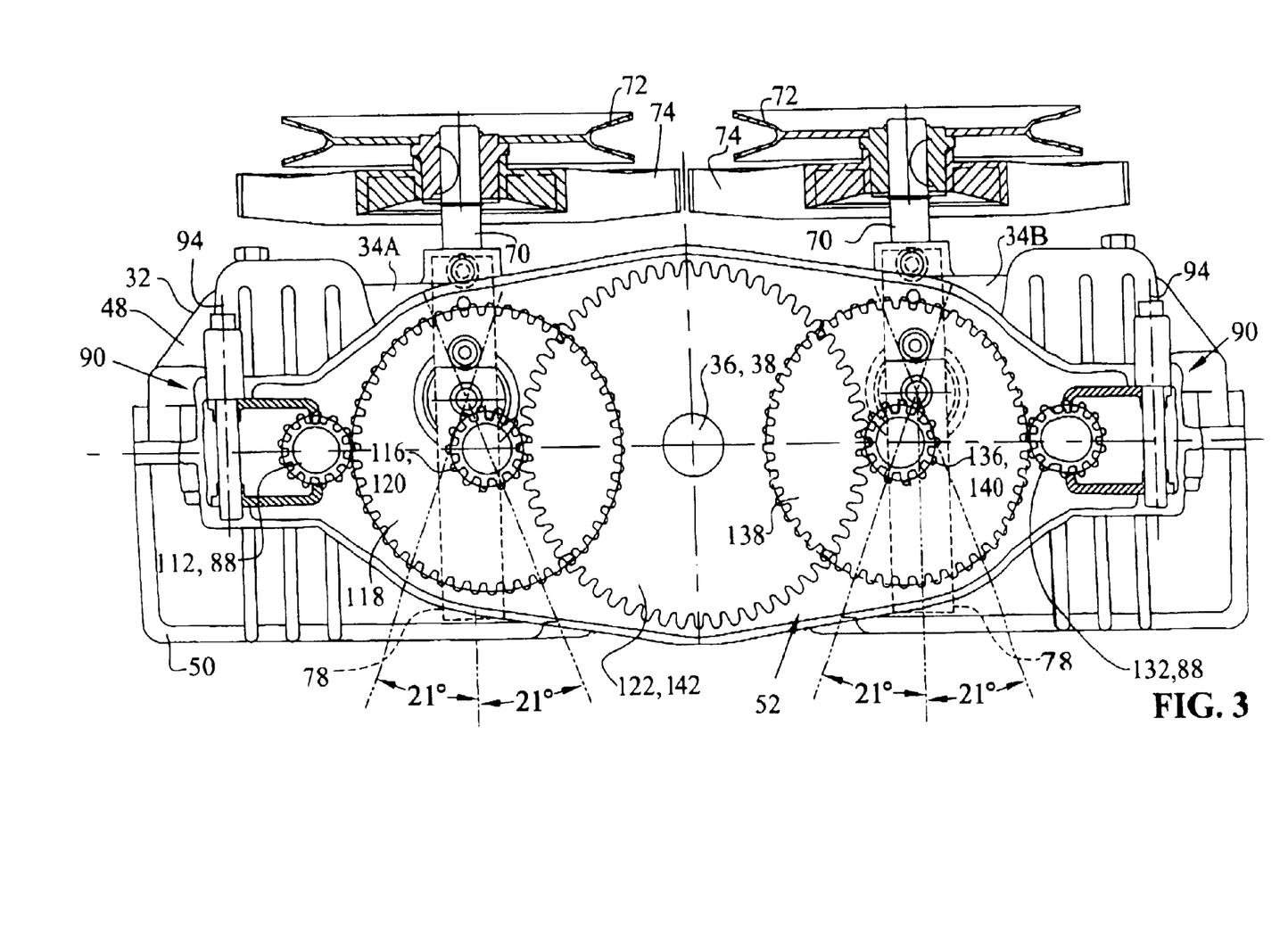
FIG. 3 is a sectional side view of the hydrostatic transmission of FIG. 1.

Each of hydrostatic transmission modules 34a, 34b respectively includes a housing comprising upper portion 60a, 60b and lower housing portion 62a, 62b. Housing portions 60a, 60b and 62a, 62b are respectively identical except for being mirror images of one another. Disposed within each of hydrostatic transmission modules 34a, 34b is center section or block 64a, 64b, respectively. Center sections or blocks 64a and 64b are mirror images of each other, the structure of one of which is detailed in above-incorporated U.S. Pat. No. 6,301,885. Each of the hydrostatic transmission modules include axial piston pump 66 and axial piston motor 68 mounted to its center section or block 64. Referring to FIG. 3, each of pumps 66 is provided with input shaft 70 to which is affixed drive pulley 72 and fan 74. Pulleys 72 are driven by the mower engine (not shown) and are rotated in the same direction to impart constant-speed rotating motion to pumps 66.

Figure 4:
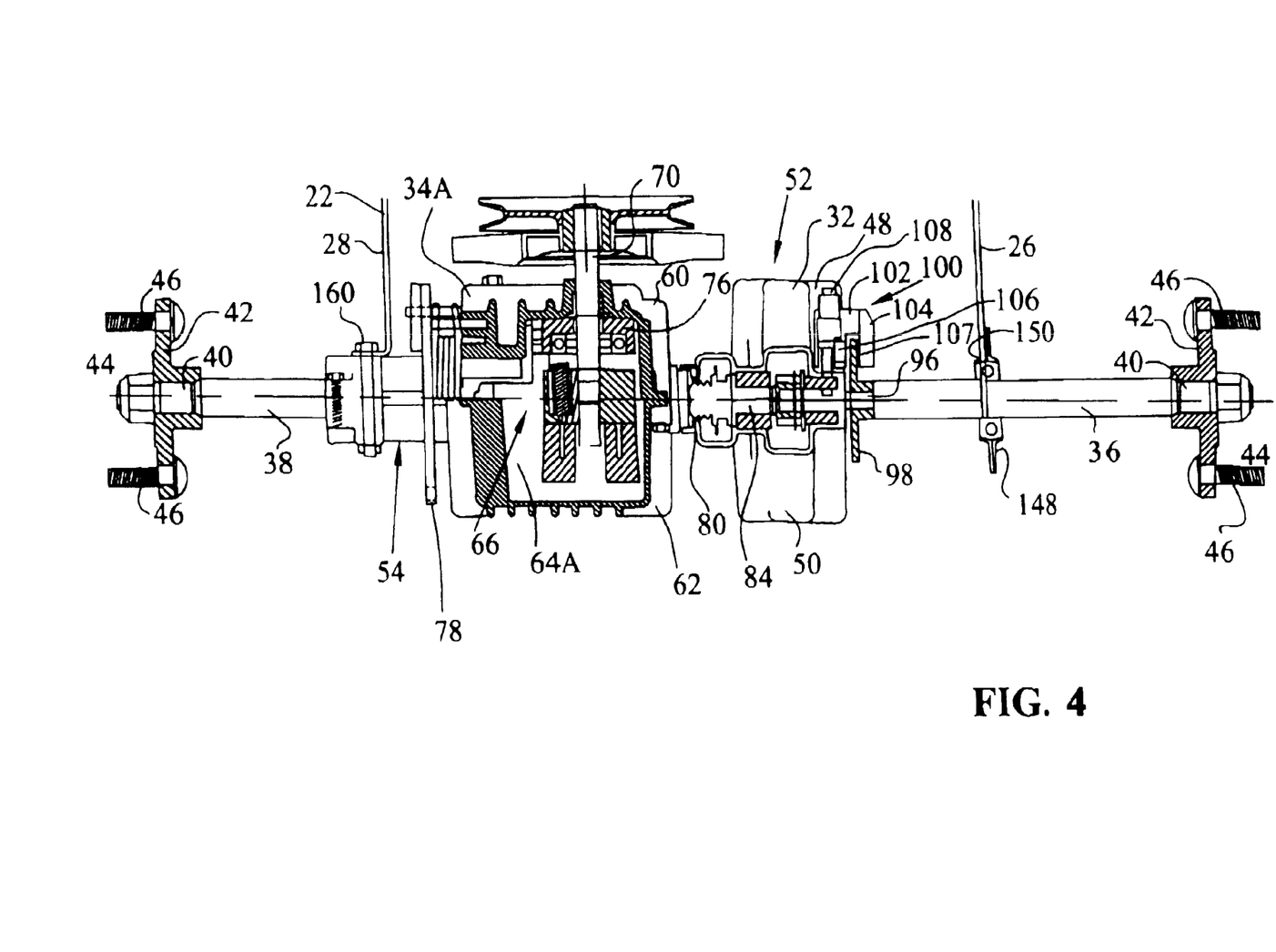
FIG. 4 is a side view of the hydrostatic transmission of FIG. 1 along line 4—4 thereof.
Figure 5:
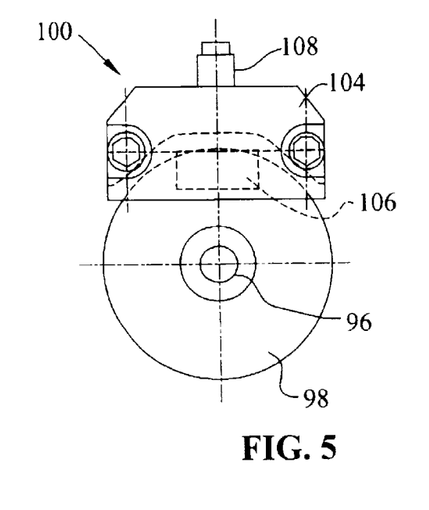
FIG. 5 is a side view of a first embodiment of one of the brake assemblies according to the present invention.
Figure 6:
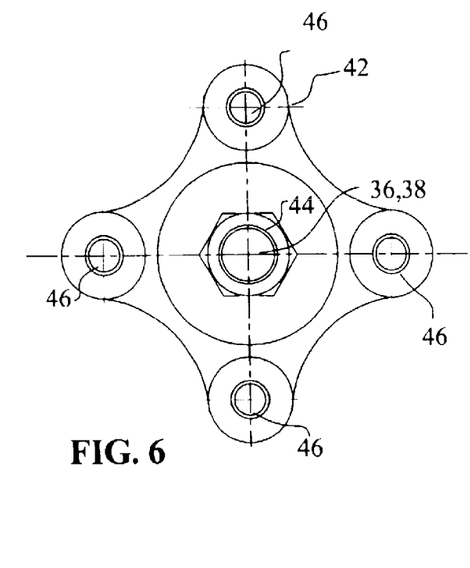
FIG. 6 is a view of one of the wheel-mounting flanges of the transmission, along line 6—6 of FIG. 1.

Each of pumps 66 is of variable displacement, and the displacement, and direction of fluid flow between the pump and its respective motor, is controlled by swash plate assembly 76 (FIG. 4). The operation of axial piston pump and motor combinations is generally well known in the art. The swash plate assembly is adjusted through pivoting movement of lever 78 (FIG. 3) provided on each of hydrostatic transmission modules 34a and 34b. Levers 78 may be provided with a neutral adjustment mechanism and return spring as described in above-incorporated U.S. patent application Ser. No. 09/671,796. As shown in FIG. 3, each of levers 78 pivots its swash plate assembly approximately 21° from its neutral position in the forward and reverse directions for controlling the pump displacement and direction of fluid flow to the motor. As is well known in the art, at the pump neutral position substantially zero fluid flow is provided to the motor, and the motor is then not driven in either direction. Fluid flow from the pump to the motor through one conduit within block 64 will drive the motor in a forward rotating direction; and fluid flow from the pump to the motor through another conduit within the block will drive the motor in the reverse rotating direction. Each of rotatable motors 68 drives a transmission output shaft 80 radially supported within a bearing 81, a portion of which extends axially from the transmission module housing, the end of each transmission output shaft 80 being provided with splines 82, as best shown in FIGS. 2A and 2B.

Figure 2A:
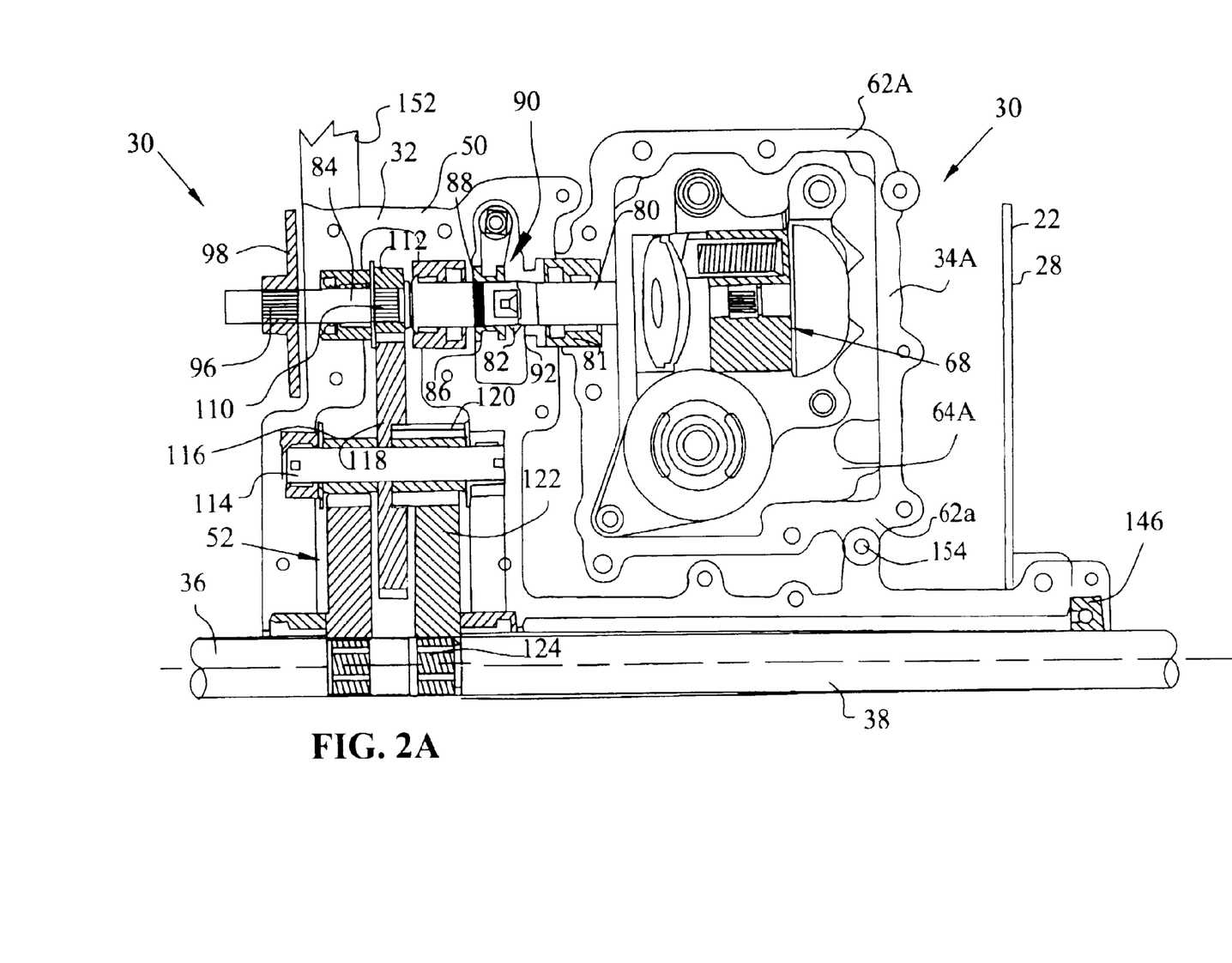
FIG. 2A is an enlarged sectional plan view of the upper portion of FIG. 1.
Figure 2B:
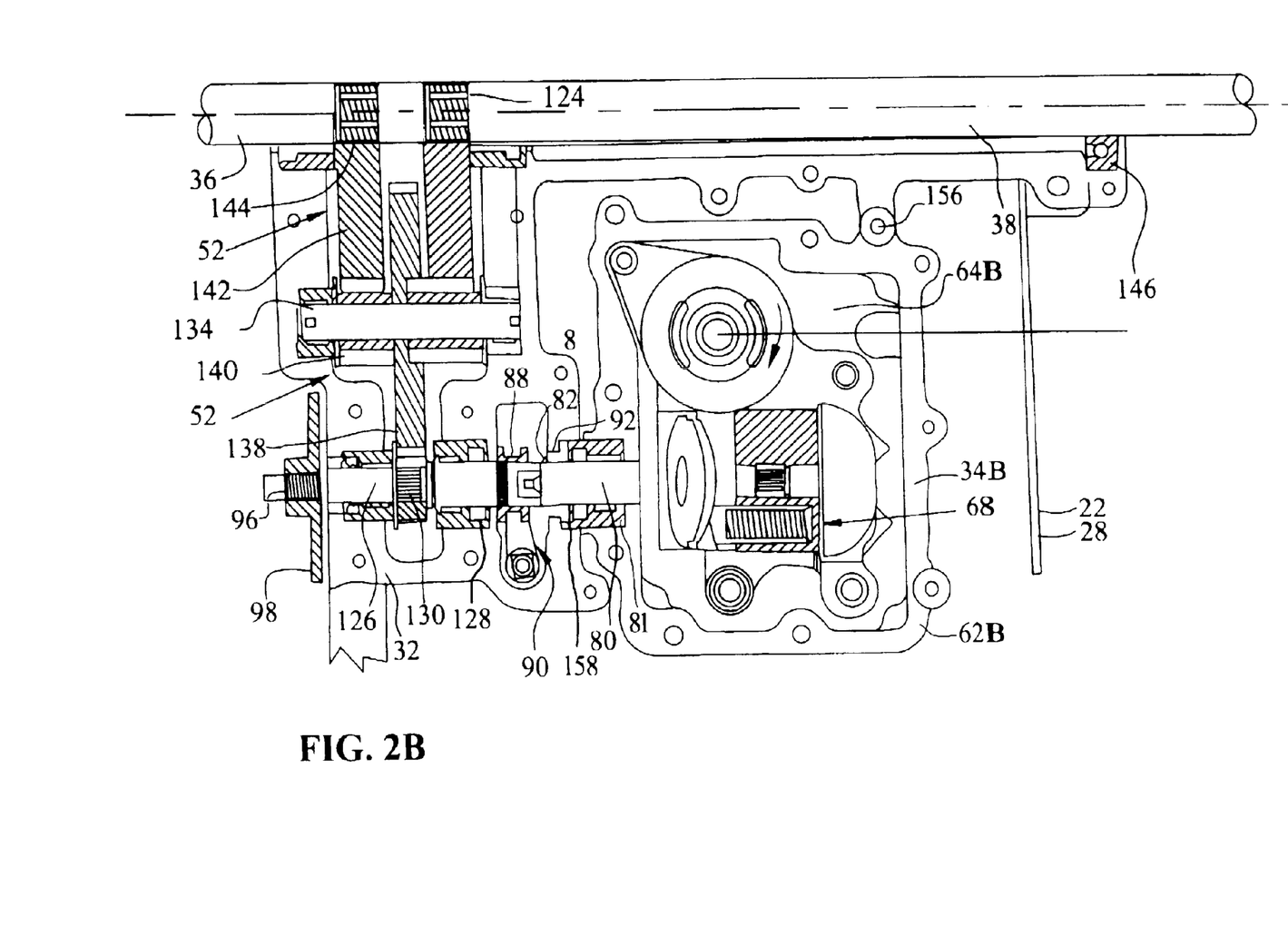
FIG. 2B is an enlarged sectional plan view of the lower portion of FIG. 1.
Figure 7:
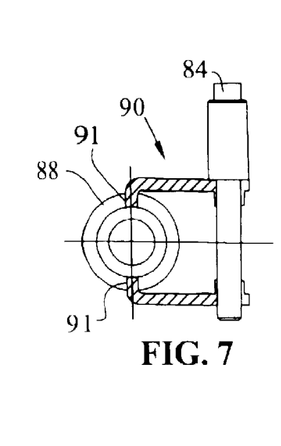
FIG. 7 is a sectional view of one of the drive disconnect mechanism of the transmission, along line 7—7 of FIG. 1.

With reference now to FIG. 2A, it can be seen that the end of transmission output shaft 80 of hydrostatic transmission module 34a is provided with a cylindrical, axially-extending recess into which the cylindrical end of first axle drive input shaft 84 is piloted. The piloted end of input shaft 84 is smaller in diameter than the adjacent portion of shaft 84, which is provided with splines 86 and is of the same diameter as output shaft 80. Internally splined collar 88 is provided which at all times engages splines 82 of transmission output shaft. Collar 88 is biased by spring 92 into an engaged position in which its internal splines also engage splines 86 of input shaft 84 to effect coupling between the hydrostatic transmission module 34a and first axle drive input shaft 84. Referring to FIG. 7, collar 88 is provided with an external circumferential groove into which tines 91 of fork 90 are slidably received. Fork 90 pivots about axis 94 to move collar 88 between its engaged position (shown), in which it overlaps splines 86 and splines 82, and against the force of spring 92 to a disengaged position in which the collar is entirely received on splines 82 of transmission output shaft 80. In the collar disengaged position, transmission module 34a is mechanically disengaged from the gear train and its axle 38, and shafts 80 and 84 freely rotate relative to one another through their piloted connection. With collar 88 in its disengaged position, axle 38 may rotate freely for easy manual maneuvering of mower 20, a feature which may prove extremely useful in the event of hydrostatic component failure.

The end of first axle drive input shaft 84 located opposite that which is piloted into transmission output shaft 80 is provided with external splines 96 onto which is fitted the internal splines of brake disk 98 (FIG. 2A). Brake disk 98 may move axially on shaft 84 along the interfitting splines and comprises part of brake assembly 100 which has a housing formed of first brake housing portion 102, which is integral with upper housing portion 48 of T-shaped housing 32, and second brake housing portion 104, which is bolted to the first brake housing portion. Brake pads 106 and 107 are respectively contained within first and second brake housing portions 102 and 104 and slidably engage opposite sides of brake disk 98. Planar, rectangular support members (not shown) made of a metal such as steel, may be located between the brake pads and their respective housing portions to help evenly distribute the load on the pads. Brake control rod 108 extends along a direction perpendicular to the axis of shaft 84 and is provided with a flat surface which, when the brake is not engaged, is substantially parallel with the surface of brake disk 98 which engages brake pad 106.

To actuate the brake, brake control rod 108 is rotated in either direction about its longitudinal axis, and the edge at either lateral side of the rod's flat surface is brought into abutment with the support member, and forces the same, and pad 106 into frictional engagement with disk 98. Disk 98 may move slightly along splines 96 and into frictional engagement with pad 107. The movement of pad 107 is limited by second brake housing portion 104, and disk 98 therefore becomes tightly clamped between pads 106 and 107, preventing rotation of shaft 84 and thus axle 38. Normally, hydrostatic transmissions do not require mechanical braking to slow or stop the tractor or mower driven thereby; merely reducing the pump displacement to or toward zero (at neutral) is usually sufficient to effect braking. Brake assembly 100 may be used as a parking brake, however, and may be used to prevent movement of mower 20 when collar 88 is in its disengaged position. The structure and operation of first embodiment brake assembly 100 is otherwise as described further hereinbelow with regard to second embodiment brake assembly 100A.

First axle drive input shaft 84 is supported within housing 32 by means of bearings and is surrounded by shaft seals to prevent the leakage of lubricating oil therefrom. Located between the opposite ends of shaft 84 are splines 110 which engage the internal splines of spur gear 112. Jack shaft 114 is also supported by bearings within housing 32 and has spacer 116 and a compound gear comprising large diameter gear portion 118 and integral small diameter gear portion 120 rotatably disposed thereabout. Large diameter gear portion 118 is intermeshed with spur gear 112 and is driven thereby. Small diameter gear portion 120 is intermeshed with first axle drive gear 122 which is rotatably fixed via splines 124 to axle 38 for driving the right hand drive wheel 24 attached to the end thereof. It will now be understood by those of ordinary skill in the art that hydrostatic transmission module 34a receives rotary input through its input shaft 70 and through pivotal manipulation of its swash plate assembly 76 effects, when collar 88 is in its engaged position, rotation of axle 38 in forward and reverse directions at variable speeds through a gear train comprising gears 112, 118, 120 and 122.

Referring now to FIG. 2B, it is shown that motor 68 of hydrostatic transmission module 34b is similarly provided with output shaft 80 into which an end of second axle drive input shaft 126 is piloted, shafts 80 and 126 being selectively rotatably engaged through collar 88 and splines 128 and 82, as described above. In the manner described above, output shaft 80 of hydrostatic transmission module 34b and second axle drive input shaft 126 may be disengaged through rotation of fork 90, which urges collar 88 rightward as shown against the biasing force of spring 92. Like first axle drive input shaft 84, an end of second axle drive input shaft 126 is provided with splines 96 on which a brake disk 98 is disposed, and another brake assembly 100 as described above is provided for preventing rotation of shaft 26.

Second axle drive input shaft 126 is supported within housing 32 by bearings and is surrounded by shaft seals, like shaft 84. At a location between its opposite ends, second axle drive input shaft 126 is provided with splines 130 which are engaged with the internal splines of a spur gear 132. Jack shaft 134, which is identical to jack shaft 114 and is similarly supported within housing 32 by bearings, has spacer 136 and a compound gear comprising integral large and small diameter gear portions 138, 140, respectively, rotatably disposed thereabout. Large diameter gear portion 138 is intermeshed with spur gear 132, and small diameter gear portion 140 is intermeshed with second axle drive gear 142, which is rotatably fixed via splines 144, to left hand axle 36 for driving the left hand side drive wheel 24. It will now be understood by those of ordinary skill in the art that hydrostatic transmission module 34b receives rotary input through its input shaft 70 and through pivotal manipulation of its swash plate assembly 76 effects, when collar 88 is in its engaged position, rotation of axle 36 in forward and reverse directions at variable speeds through a gear train comprising gears 132, 138, 140 and 142.

It will now be appreciated by those of ordinary skill in the art that in the event a hydrostatic transmission component failure, either or both of transmissions 34a and 34b may be operatively disconnected from its respective axle drive input shaft 84 or 126, and mower 20 may thus be easily moved without having to remove the failed hydrostatic transmission module or disconnecting a drive wheel 24 from its respective axle 36 or 38. Further, either or both of the brakes associated with axle drive input shafts 84 and 126 may be actuated for slowing, stopping or preventing movement of mower 20.

Hydrostatic transmission modules 34a and 34b are each attached to axle drive housing 32 only through one bolted connection, shown at 154 and 156, and portions of transmission output shaft bearings 81 which are slidably fitted into counterbores 158 of housing 32. Hydrostatic transmission module 34a and 34b may be individually and separately removed and replaced without removal of the other transmission module from transaxle 30, or of axle drive housing 32 or either of drive wheels 24 from mower 20.

Referring again to FIG. 1, axle 38 is rotatably supported by bearing 146 provided at the end of longitudinal center portion or leg 54 of T-shaped axle housing 32. That end of the housing center portion 54 is attached to right hand frame rail 28 by means of bolts 160 (FIG. 4). Axle 38 is also supported within housing 32 by a bearing located adjacent its splines 124 and gear 122, and is there surrounded by a shaft seal. Left hand axle 36 is also supported within housing 32 by a bearing located adjacent its splines 144 and gear 142, and is there surrounded by a shaft seal. External to housing 32, axle 36 is supported by pillow block 148 which is attached to left hand frame rail 26, axle 36 and pillow block 148 being received within notch 150 provided in frame rail 26. A plurality of bolts (not shown) fix the pillow block to the left hand frame rail. A torque strap 152 (FIGS. 1 and 2A) may be provided to secure either the forward or rearward end of gear train enclosing portion 52 of housing 32 to frame 22 to counteract any tendency for transmission 30 to rotate about the axis of rotation of axles 36 and 38.

Figure 8:
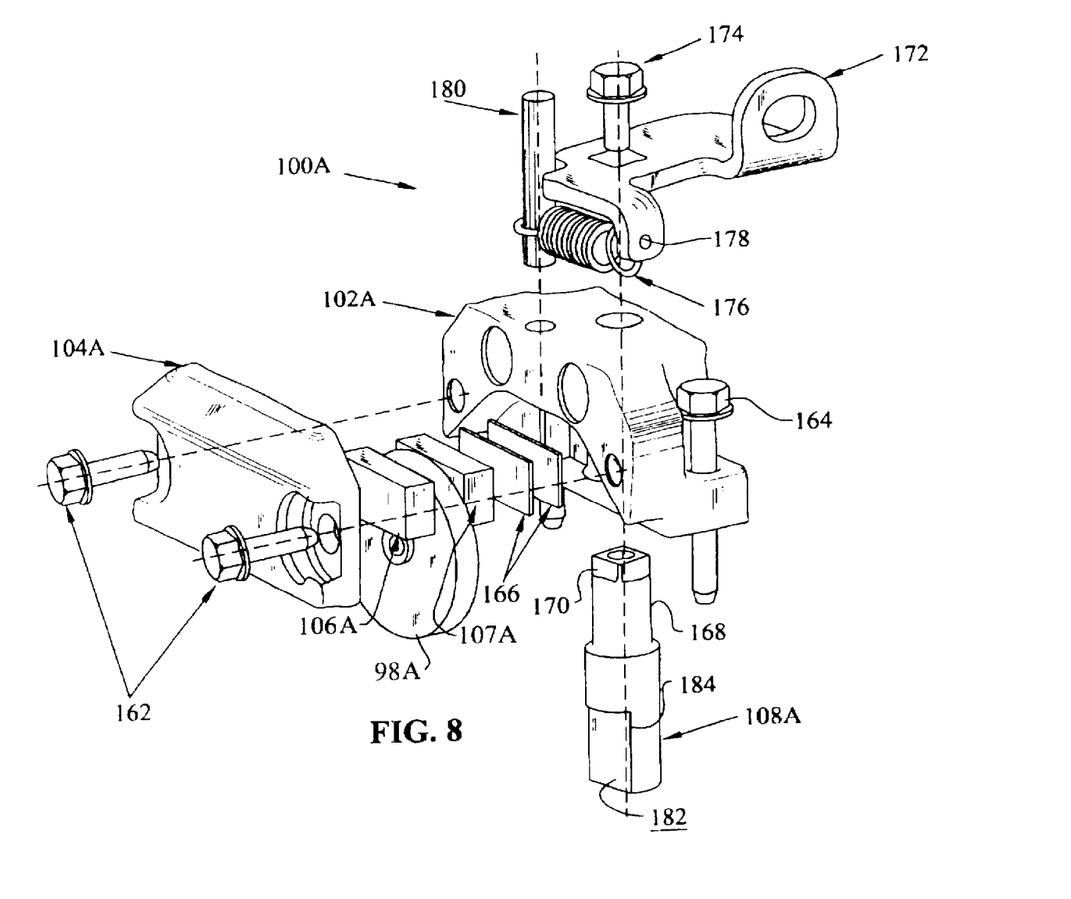
FIG. 8 is an exploded view of a second embodiment of the inventive brake assembly.

Referring to FIG. 8, second embodiment brake assembly 100A is shown as including first housing portion 102A and second brake housing portion 104A connected together by bolts 162. Brake assembly 100A differs from brake assembly 100 in that brake assembly 100A may be completely detached from transaxle housing 32 or attached easily by a pair of bolts 164. Within housing portions 102A and 104A is brake disc 98A having first and second brake pads 106A and 107A on either side thereof. Adjacent brake pad 107A are rigid shims 166, which may be utilized to distribute the load exerted when brake rod 108A is rotated into engagement therewith. Brake rod 108A is inserted in brake housing portion 102A such that upper portion 168 extends above first brake housing portion 102A wherein upper portion 168, specifically square end 170 is inserted through actuator 172 and attached thereto by bolt 174. With such a connection, when actuator 172 is moved, brake rod 108A will also rotate such that it may engage brake pad 107A to effectuate a braking action. Biasing actuator 172 into a non-rotated position is spring 176 which receives brake rod 108A and is attached to actuator 172 at tang 178 and pin 180 extending into housing portion 102A.

In operation, actuator 172 rotates via an actuation mechanism external to brake assembly 100A and then rotates brake rod 108A through engagement of square portion 170 and bolt 174. As brake rod 108A is rotated, flat surface 182 of rod 108A rotates from a position parallel to rigid shims 166 to a position wherein longitudinal edge 184 of rod 108A comes into engagement with brake shims 166. As longitudinal edge 184 contacts shims 166, shims 166 are pushed into abutment with brake pad 107A, with brake pad 107A then moving toward brake disc 98A. Brake disc 98A is structured and arranged such that it may move axially along axle 38 to which it is splined, thus when brake pad 107A comes into contact with brake disc 98A, brake disc 98A moves axially toward brake pad 106A. As brake shaft 108A is further rotated and longitudinal edge 184 pushes shims 166 into brake pad 107A, brake disc 98A moves closer toward brake pad 106A until the two abut. At that point, both brake pads 106A and 107A are in braking engagement with brake disc 98A, thus braking action is realized.

While this invention has been described as having exemplary designs, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A transaxle for a small utility vehicle or implement, comprising:

a casing;

at least one rotatable shaft disposed in and extending from said casing;

at least one brake disc, said brake disc rotatably fixed to said rotatable shaft for rotation therewith; and at least one braking mechanism, said braking mechanism comprising:

at least one friction puck disposed proximate said brake disc; and a brake shaft having a flat surface forming a longitudinal edge;

wherein said brake shaft has an engaged position in which said longitudinal edge is in operative engagement with said friction puck and said friction puck is in pressing engagement with said brake disc, and a disengaged position in which said longitudinal edge is out of operative engagement with said friction puck.

2. The transaxle of claim 1, wherein said braking mechanism further comprises a spring, said spring biasing said brake shaft into said disengaged position, and said cam surface is disposed parallel to said brake disc.

3. The transaxle of claim 1, wherein said transaxle comprises a pair of casing halves split along a plane coincident with an axis of rotation of said rotatable shaft.

4. The transaxle of claim 3, wherein said braking mechanism is externally mounted on one of said casing halves proximate to the locations at which said rotatable shaft extends from said casing.

5. The transaxle of claim 1, wherein said transaxle includes two rotatable shafts and two said braking mechanisms, each said braking mechanism being in selective operative engagement with one of said two rotatable shaft.

6. The transaxle of claim 5, wherein each said braking mechanism is in braking engagement with one of said two shafts.

7. The transaxle of claim 5, wherein each said braking mechanism is in braking engagement one of said rotatable shafts independent of the other said braking mechanism.

8. The transaxle of claim 1, said braking mechanism further comprising a brake housing, said friction puck and at least a portion of said brake shaft being disposed in said brake housing.

9. The transaxle of claim 8, wherein said brake housing includes a first and a second portion, said second portion mounted to the exterior of said casing, said first portion removably attached to said second portion.

10. The transaxle of claim 8, wherein said brake housing includes a first and second portion, said second portion being integrally formed with said casing, said first portion being removably attached to said second portion.

11. The transaxle of claim 1, wherein said shaft is an axle.

12. A braking mechanism for a transaxle in a small utility vehicle said braking mechanism comprising:

a rotatable brake disc;

at least one friction puck disposed proximate said brake disc; and a brake shaft having a flat surface forming a longitudinal edge;

wherein said brake shaft has an engaged position in which said longitudinal edge is in operative engagement with said friction puck and said friction puck is in pressing engagement with said brake disc, and a disengaged position in which said longitudinal edge is out of operative engagement with said friction puck.

13. The braking mechanism of claim 12, said braking mechanism further comprising a spring, said brake shaft being biased by said spring into said disengaged position.

14. The braking mechanism of claim 12, said braking mechanism further comprising a brake housing, and wherein said brake disc, said friction puck, and at least a portion of said brake shaft are received in said brake housing.

15. The braking mechanism of claim 14, wherein said brake housing includes a first and a second portion, said first portion removably attached to said second portion, and said second portion having means for being mounted to a transmission casing.

16. The braking mechanism of claim 15, wherein said means includes said second portion being integrally formed with a transmission casing.

17. A transmission for a vehicle, comprising:

a casing;

at least one rotating shaft extending from said casing;

a brake disc rotatably fixed to said rotating shaft for rotation therewith; and at least one braking mechanism comprising:

a brake housing;

at least one friction puck disposed proximate said brake disc;

a brake shaft having a flat surface forming a longitudinal edge, said brake shaft having a first, rotated position in which said longitudinal edge is in operative engagement with said friction puck and said friction puck is in pressing engagement with said brake disc, and a second position wherein said longitudinal edge is not in operative engagement with said friction puck and said cam surface faces said friction puck.

18. The transmission of claim 17, wherein said brake housing has a first half and a second half, said second half being integrally formed with said casing and said first half being removably attached to said second half.

19. The transmission of claim 17, wherein said brake housing has a first half and a second half, said second half being mounted externally of said casing and said first half being removably attached to said second half.

\* \* \* \* \*